United States Patent

[11] 3,550,679

[72] Inventors Albert R. Benbow;
 Donald J. Suray, Weirton, W. Va.
[21] Appl. No. 802,411
[22] Filed Feb. 26, 1969
[45] Patented Dec. 29, 1970
[73] Assignee National Steel Corporation
 a corporation of Delaware

[54] WATER COOLED PLATFORM AND METHOD OF REPAIRING COPINGS EMPLOYING THE SAME
 12 Claims, 6 Drawing Figs.

[52] U.S. Cl. ................................................ 165/47,
 110/180, 122/498, 165/67, 165/168, 165/170,
 263/44
[51] Int. Cl. ............................................... F23m 5/08,
 F28f 3/12
[50] Field of Search ................................................ 165/47, 67,
 168, 170; 263/44; 110/173, 180; 122/497, 498;
 266/5; 100/93

[56] References Cited
 UNITED STATES PATENTS

| 312,578 | 2/1885 | Nightengale | 110/180X |
| 2,209,561 | 7/1940 | Curtis | 165/170X |
| 2,627,289 | 2/1953 | Berthelsen | 100/93X |
| 2,627,290 | 2/1953 | Berthelsen | 100/93X |

*Primary Examiner*—Albert W. Davis, Jr.
*Attorney*—Shanley and O'Neil

ABSTRACT: An improved water-cooled platform adapted to be placed temporarily across a top-opening furnace, such as a soaking pit, for the purpose of permitting workmen to make repairs to the coping without cooling down the furnace. The invention also provides a novel method of making repairs to the coping of soaking pits and other types of top-opening furnaces without cooling down the furnaces wherein a water-cooled platform is employed to protect the workmen.

INVENTORS
ALBERT R. BENBOW
DONALD J. SURAY

BY Shanley & O'Neil
ATTORNEYS

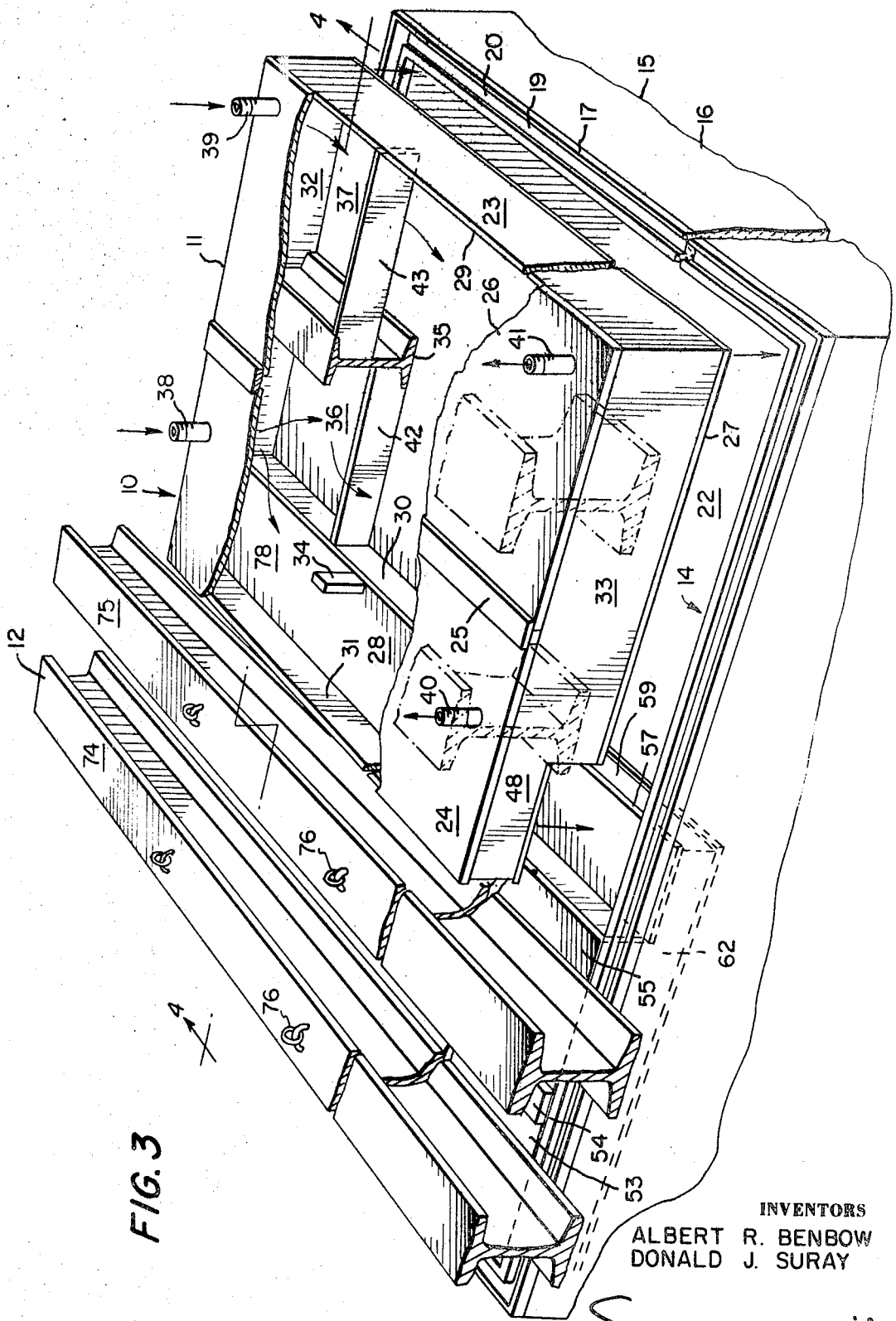

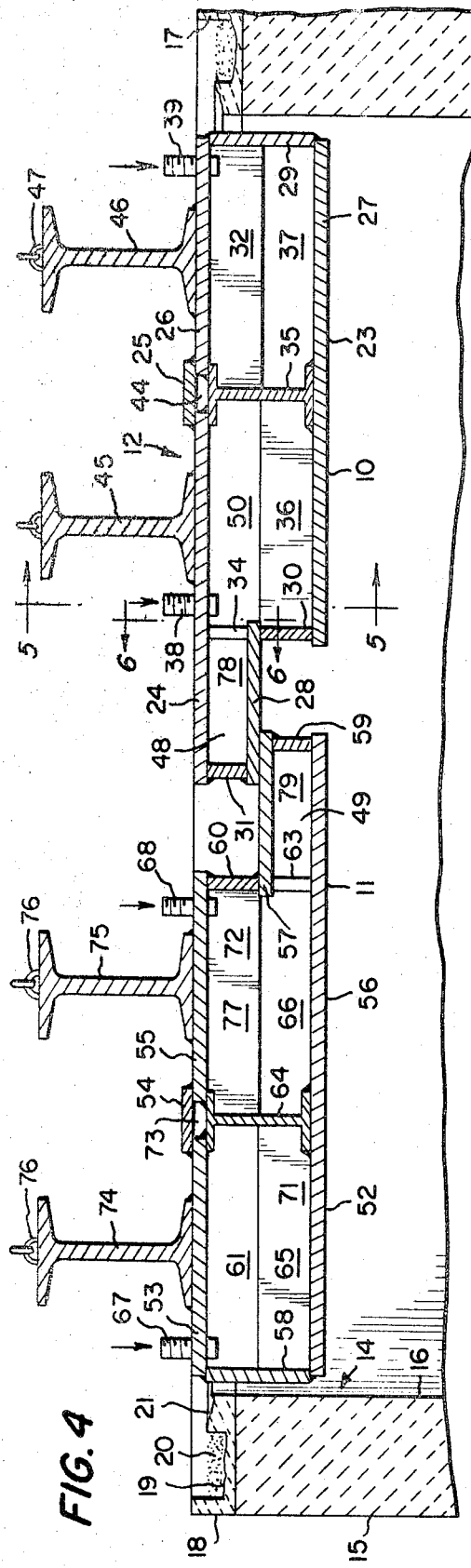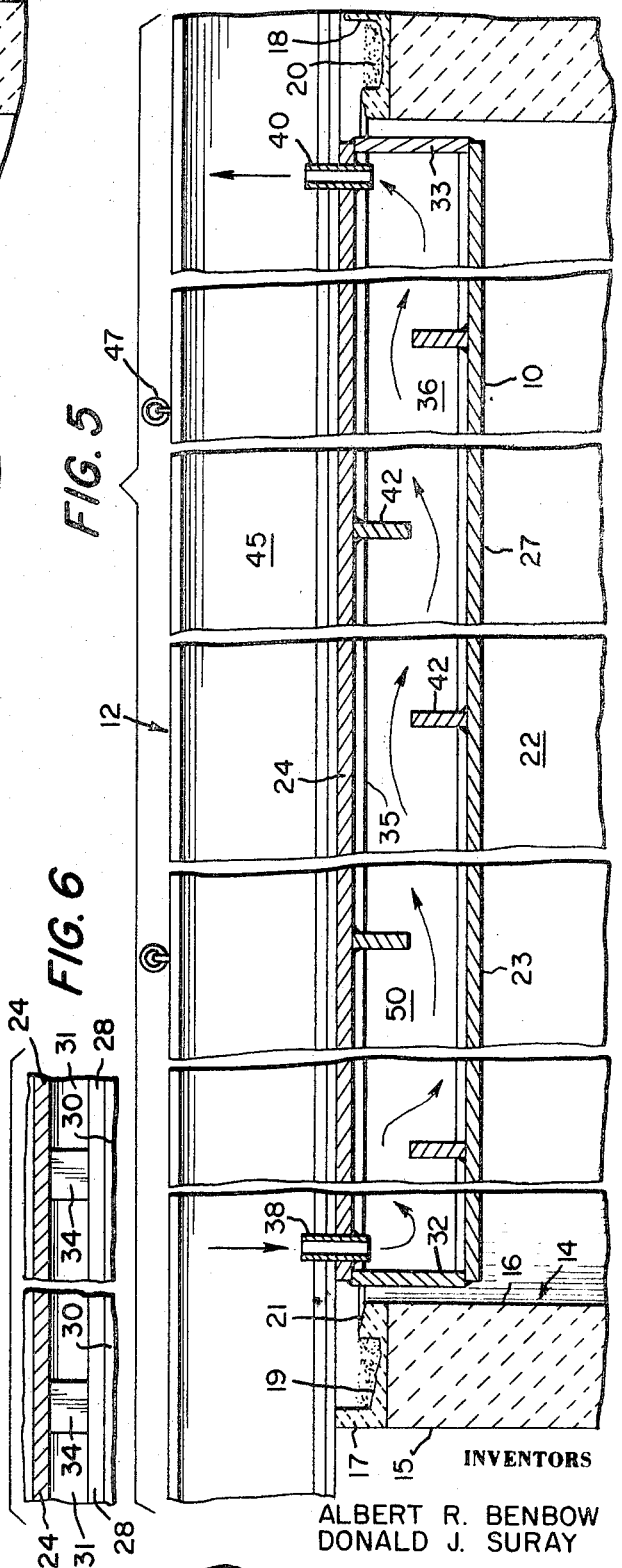

WATER COOLED PLATFORM AND METHOD OF REPAIRING COPINGS EMPLOYING THE SAME

BACKGROUND OF THE INVENTION

Top opening or pit furnaces are used extensively in the steel industry for the heating and/or melting of ferrous metal charge stocks. For instance, top-opening soaking pits are used to uniformly heat steel ingots to a desired rolling temperature prior to delivering to a hot-rolling mill. The ingots are usually heated to a temperature between about 2150° F. and 2450° F., and thus the soaking pits are operated under severe temperature conditions.

The construction and operation of soaking pits is disclosed in numerous publications. For example, various types of top-opening soaking pits are disclosed on Pages 619—624 of the text The Making, Shaping and Treating of Steel, 8th Edition (1964), and in U.S. Pat. Nos. 2,474,504, 2,839,290 and 3,378,247, the teachings of which are incorporated herein by reference.

Most soaking pits in use today are approximately rectangular in configuration, and have reinforced refractory walls which may be constructed of silica refractory shapes. The soaking pits have a depth which is sufficient to allow steel ingots to be heated in an upright position, and grooved coping blocks are used to cap the walls. The grooves in the coping blocks form a continuous trough around the top of the soaking pit, and sand or other refractory material in finely divided form is used to fill the coping trough.

The top of the soaking pit is provided with a removable refractory cover which rests on the coping blocks. The cover has a continuous downwardly projecting lip around the edge which extends into the sand in the coping trough to thereby form a seal and prevent entry of air into the interior of the soaking pit. From time to time the cover is removed to allow cold ingots to be emplaced for heating and hot ingots to be removed for rolling, and then the cover is replaced. The cover is removed and replaced by means of a crane which travels along track beams located on opposite sides of the soaking pit, and the coping is subject to wear and tear each time that the cover is removed and replaced. Also, due to the high operating temperature and the periodical opening and closing of the soaking pit, the refractory walls in the vicinity of the coping are subjected to alternate heating and cooling. The marked changes in temperature cause the grooved coping blocks to crack and erosion in general is pronounced at the high operating temperature. With continued operation of the soaking pit, eventually the coping is damaged sufficiently to allow the sand in the coping trough to pour into the interior of the furnace through cracks formed therein. When this occurs, it is no longer possible to form a satisfactory seal with the lip on the soaking pit cover and it is necessary to repair the coping and replace the sand. The coping must be repaired at much more frequent intervals than the remaining refractory construction in the soaking pit and thus heretofore coping repairs were responsible for most of the down time.

Prior to the present invention, it was necessary to remove the ingot charge and shut down the soaking pit for at least a day and allow the interior to cool gradually to a temperature sufficiently low for workmen to repair the coping from a portable scaffold. After the repairs were completed, the soaking pit was gradually heated back up to the operating temperature. The soaking pit was out of service for at least one to two days when using this method of coping repair. Additionally, the refractory construction in general was damaged due to the extreme temperature changes encountered over the cooling down and heating up cycles, and this tended to increase the frequency at which major repairs had to be made.

The usual routine repairs to the coping of a soaking pit may be completed in only 1 to 2 hours after the workmen are able to enter the soaking pit when using specialized modern equipment and materials. Thus, the prior art cooling and reheating cycles greatly increase the overall period of time that a soaking pit is out of service for coping repairs. As a result, the art has long sought an entirely suitable method and apparatus whereby workmen may make repairs to the coping in safety and comfort immediately after the soaking pit has been shut down, thereby avoiding the cooling and reheating cycles and reducing the down time to a few hours.

SUMMARY OF THE INVENTION

The present invention provides an improved water-cooled platform which is adapted to be temporarily placed across the top of a soaking pit or other forms of top-opening furnaces whereby workmen may make repairs to the coping immediately after the furnace has been shut down. The platform is constructed from a plurality of water-cooled platform members which are adapted to be fitted together so as to be adjustable transversely. This adjustable feature is important as the platform width may be varied to compensate for changes which invariably occur in the original width of the soaking pit due to erosion of the refractory walls, the tendency of the refractory walls to sag or bow with age, etc.

The invention also provides a novel method of making repairs to the coping of soaking pits and other types of top-opening furnaces. When practicing the method of the invention, workmen may commence repairing the coping of a soaking pit immediately after the fuel has been shut off and the water-cooled platform of the invention has been set in place, thereby assuring that the soaking pit is out of service for a minimum period of time. The usual routine repairs to the coping may be made and the soaking pit placed back in service in about 1 to 4 hours when practicing the method of the invention whereas the prior art method required at least 1 to 2 days. The method of the invention also avoids damage to the overall refractory construction of the soaking pit caused by the cooling down and reheating cycles of the prior art method, and thereby markedly reduces the need for major repairs.

BRIEF DESCRIPTION OF THE DRAWINGS

FIG. 3 is a perspective view, with portions thereof being broken away to illustrate details within the interior of the water-cooled platform members, wherein one of the platform members is shown in place across the opened top of a soaking pit and the other is shown as it is being lowered into position;

FIG. 4 is a transverse cross-sectional view taken along the line 4—4 of FIG. 3;

FIG. 5 is a longitudinal cross-sectional view, with portions thereof being broken away, taken along the line 5—5 of FIG. 4; and FIG. 6 is an enlarged fragmentary longitudinal cross-sectional view taken along the line 6—6 of FIG. 4.

DETAILED DESCRIPTION OF THE INVENTION INCLUDING PREFERRED EMBODIMENTS AND VARIANTS THEREOF

Figure 1:
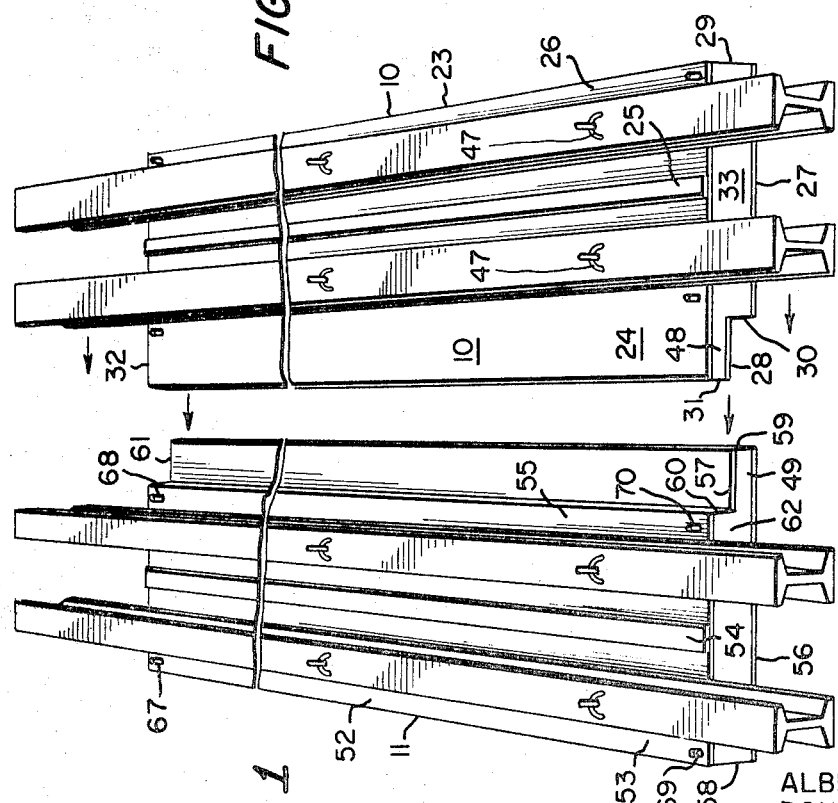
FIG. 1 is a perspective view of a pair of water-cooled platform members adapted to be fitted together along their longitudinal dimension and used in constructing a water-cooled platform in accordance with the invention.

Referring now to the drawings, the pair of water-cooled platform members 10 and 11 illustrated in FIG. 1 may be used in constructing the water-cooled platform 12 of the invention which, as is best seen in FIGS. 2—5, is positioned in the uncovered opening 14 of soaking pit 15. The soaking pit 15 has refractory walls 16, and the coping 17 thereof is constructed of grooved coping blocks 18 which provide a continuous coping trough 19. As is best seen in FIGS. 4 and 5, the coping trough 19 is partially filled with sand 20 and the coping 17 has damaged areas 21 which allow the sand to pour into the soaking pit interior 22. The damaged coping 17 and the loss of sand from trough 19 prevent a satisfactory seal from being made with a removable cover which is normally in place thereon when the soaking pit is fired and in operation for heating steel ingots to a hot rolling temperature.

The soaking pit cover, the usual crane and apparatus cooperating therewith for removing and replacing the soaking pit cover, the lower portions of the soaking pit refractory walls 16, the burners and apparatus cooperating therewith for firing and heating the soaking pit 15 may be in accordance with the prior art, and are omitted in the interest of simplifying the drawings. The steel ingots to be heated, which are normally positioned within the soaking pit interior 22, also have been omitted from the drawings for this purpose.

As will be recognized by those skilled in this art, in normal operation the soaking pit 15 is fired and the interior 22 contains steel ingots which are heated to a hot rolling temperature of about 2150—2450° F. Thus, the soaking pit 15 is operated at an extremely high temperature and it is necessary to discontinue the firing thereof prior to repairing the damaged coping areas 21. The hot ingots within the soaking pit interior 22 may or may not be removed as desired. However, it is usually preferred to remove the hot ingots and replace them with cold ingots. Cold ingots are capable of absorbing a substantial amount of heat from the hot interior 22 and thereby reduce the heat load on the water-cooled platform 12.

The platform member 10 includes an elongated water tight steel shell 23 which may be constructed from longitudinally extending top plates 24, 25 and 26, bottom plate 27, intermediate plate 28 and side plates 29, 30 and 31, and transversely extending end plates 32 and 33. The interior of shell 23 is reinforced by a longitudinally extending I-beam 35 which is of a length to abut the end plates 32 and 33. The reinforcing I-beam 35 preferably is welded to the spaced top plates 24 and 26, bottom plate 27, and/or end plates 32 and 33. Inasmuch as the top plates 24 and 26 and bottom plate 27 rest on the top and bottom surfaces of I-beam 35, respectively, this results in the division of the interior of the shell 23 into two longitudinally extending water passageways 36 and 37. Cooling water is supplied to water passageways 36 and 37 via water conduits 38 and 39, respectively, and after passing therethrough, the water is withdrawn via water outlet conduits 40 and 41, respectively.

A series of spaced baffles 42 is provided in water passageway 36, and a similar series of baffles 43 is provided in water passageway 37. The baffles 42 and 43 extend transversely from the side plates 30 and 29, respectively, to the reinforcing I-beam 35 and abut the same at either end. As is best seen in FIGS. 3 and 5, the series of baffles 42 and 43 are arranged whereby the flow of water through the water passageways 36 and 37 is directed alternately upward onto the under surface of the top plates 24 and 26, respectively, and downward onto the upper surface of bottom plate 27. For instance every other baffle member 42 and 43 is welded to the under surfaces of top plates 24 and 26 and extend downward therefrom to approximately one-half of the depth of the water passageways 36 and 37, respectively, and the next preceding or succeeding baffle member 42 or 43 is welded to the internal surface of the bottom plate 27 and extends upward therefrom to approximately one-half of the depth of the water passageway 36 or 37. This arrangement reduces localized heating and assures that a more uniform temperature level is maintained within the shell 23.

The preferred method of constructing the shell 23 from plates 24—33 is by welding in the manner best seen in FIGS. 3, 4, 5 and 6 of the drawings. For example, the side plates 29 and 30 may be welded to the right and left side edges, respectively, of the upper surface of bottom plate 27, and arranged to extend upwardly therefrom and form substantially a 90° angle therewith. The reinforcing I-beam 35 is also welded to the upper surface of bottom plate 27, and it is positioned approximately equal distances from side plates 29 and 30. The inner side edge of intermediate plate 28 rests upon the top of side plate 30 and is welded thereto, and plate 28 then extends outward from plate 30. The side plate 31 is carried by the outer end of intermediate plate 28 and it is welded thereto, extends upward therefrom, and is arranged to form substantially a 90° angle therewith. Spaced posts 34 for supporting top plate 24 are welded on the upper surface of the inner end of intermediate plate 28, and form substantially a 90° angle therewith. The outwardly projecting longitudinally extending portion 48 above plate 28 cooperates with a somewhat similar portion 49 on platform member 11 and forms an overlapping adjusting means for varying the effective width of the platform 12.

The top plates 24 and 26 are spaced-apart along their inner side edges at point 44 so as to provide access to the upper surface of reinforcing I-beam 35 for welding thereto. This arrangement allows the reinforcing I-beam 35 to be rigidly joined to the bottom plate 27 and to each of the top plates 24 and 26 by welding, whereby a greater reinforcing effect is obtained and especially when taken in combination with the transversely extending baffles 42 and 43. The plate 25 overlaps the inner side edges of top plates 24 and 26 and is welded thereto for the purpose of reinforcing the same. The outer ends of top plate 24 and 26 rest upon the upper surfaces of side plates 31 and 29, respectively, and are welded thereto. The end plates 32 and 33 extend transversely across the rear and forward edges, respectively, of top plates 24—26, bottom plate 27 and side plates 29—31, and are joined thereto by welding so as to complete the shell 23 and assure the water tight integrity thereof.

Figure 2:
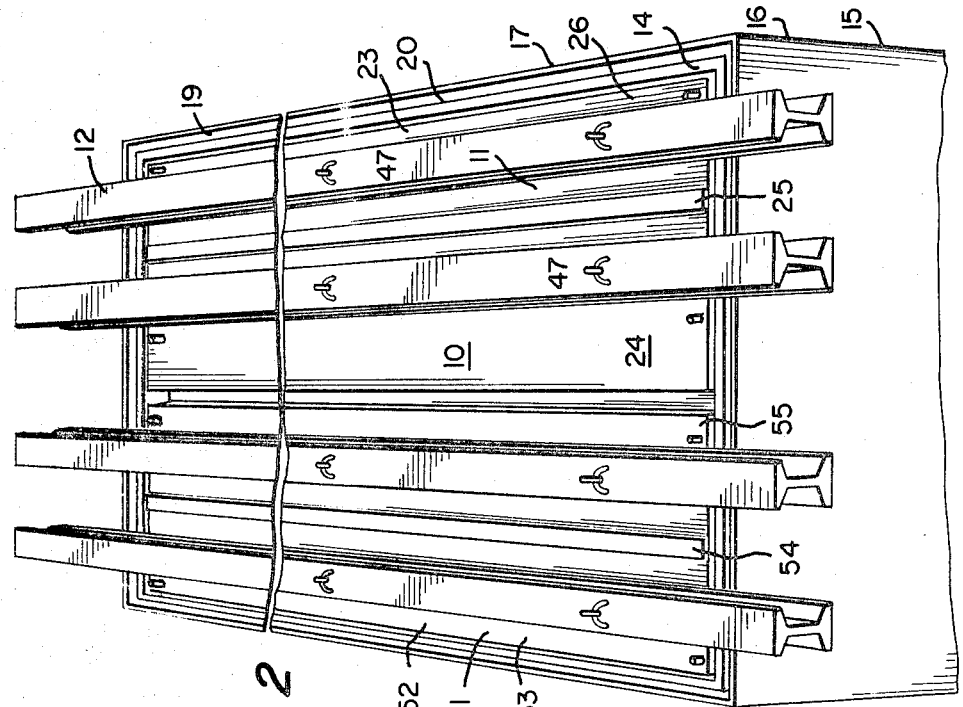
FIG. 2 is a perspective view illustrating the water-cooled platform of the invention in place across the opened top of a soaking pit.

A pair of longitudinally extending supporting I-beams 45 and 46 rest upon the upper surfaces of plates 24 and 26, respectively, and are welded thereto. I-beams 45 and 46 are of a length substantially greater than the length of the shell 23. As is best seen in FIG. 2, the ends of I-beams 45 and 46 extend a sufficient distance past the ends of the shell 23 to rest upon the coping 17 of soaking pit furnace 15 when the shell 23 is positioned within the opening 14. The I-beams 45 and 46 are provided with rings 47 for use with crane hooks whereby the platform member 10 may be positioned on soaking pit 15 or removed therefrom.

The arrangement of the plates 24—33 is such that longitudinally extending horizontal planes passing through bottom plate 27, the intermediate plate 28, and the top plates 24, 25 and 26 are preferably substantially parallel. Similarly, longitudinally extending vertical planes passing through side plates 29, 30 and 31 are preferably substantially parallel. The shell 23 is preferably of a length to be received in the opening 14 in close fitting relationship as is best seen in FIG. 5, and is supported therein by I-beams 45 and 46 which rest upon the coping 17. The upper surface of shell 23 is substantially level with the upper surface of the coping 17 whereby the amount of heat that is radiated onto the surface of platform 12 is reduced. For instance, if the shell 23 should be supported in opening 14 substantially below the upper surface of coping 17, the hot refractory wall 16 and coping 17 would be free to radiate much more heat onto the upper surface of platform 12.

The platform members 10 and 11 are of similar construction with the exception of the location of the overlapping adjusting means 48 and 49, respectively, which extend longitudinally along one side thereof. If desired, an adjusting means 48 or 49 may be provided along each side of the platform members 10 and 11. As is best seen in FIG. 4, the adjusting means 48 on platform member 10 extends outward beneath the top plate 24 and is slidable over the top of adjusting means 49 on platform member 11, thereby allowing the effective width of the platform 12 to be varied to fit the width of opening 14 in soaking pit 15. This is of importance as the refractory wall 16 varies in width as it ages.

The platform member 11 likewise includes an elongated water tight steel shell 52 which is constructed from longitudinally extending top plates 53, 54 and 55, bottom plate 56, intermediate plate 57, and side plates 58, 59 and 60, and transversely extending end plates 61 and 62. The interior of shell 52 is reinforced by a longitudinally extending I-beam 64 which preferably is welded to top plates 53 and 55, bottom plate 56 and/or end plates 61 and 62. Inasmuch as top plates 53 and 55 and bottom plate 56 rest on the top and bottom surfaces of reinforcing I-beam 64, respectively, the shell 52 is divided into longitudinally extending water passageways 65 and 66. Cooling water is supplied to water passageways 65 and 66 via water inlet conduits 67 and 68, respectively, and after passing therethrough, the water is withdrawn via water outlet conduits 69 and 70, respectively. As is best seen in FIG. 3, cooling water also passes through the longitudinally extending spaces 78 and 79 within adjusting means 48 and 49, respectively.

A series of spaced baffles 71 is provided in water passageway 65, and a similar series of baffles 72 is provided in water passageway 66. The baffles 71 and 72 are similar in construction and arrangement to baffles 42 and 43 and extend transversely from the side plates 58 and 60, respectively, to the reinforcing I-beam 64 and abut the same at either end. The baffles 71 and 72 are arranged to direct the flow of water through the water passageways 65 and 66 in the same manner as was discussed previously for the baffles 42 and 43 in water passageways 36 and 37.

When constructing the shell 52 from plates 53—62, the side plates 58 and 59 may be welded to the left and right side edges, respectively, of the upper surface of bottom plate 56. The reinforcing I-beam 64 may also be welded to the upper surface of bottom plate 56 and is positioned approximately equal distances from side plates 58 and 59. The outer side edge of intermediate plate 57 rests upon the top of side plate 59 and is welded thereto, and the plate 57 then extends inward from plate 59. The side plate 60 is carried by the inner end of intermediate plate 57 and is welded thereto and extends upward therefrom. Spaced posts 63 are positioned on plate 56 under the inner end of intermediate plate 57 whereby the intermediate plate 57, side plate 60 and the outer end of top plate 55 are supported thereby.

The top plates 53 and 55 are spaced along their inner side edges at point 73 and are welded to the upper surface of reinforcing I-beam 64. The plate 54 overlaps the inner side edges of top plates 53 and 55 and is welded thereto for the purpose of reinforcing the same. The outer ends of top plates 53 and 55 rest upon the upper surfaces of side plates 58 and 69, respectively and are welded thereto. The end plates 61 and 62 extend transversely across the rear and forward edges, respectively, of top plates 53—55, bottom plate 56, and side plates 58—60 and are welded thereto so as to complete the shell 52 and assure the water tight integrity thereof.

A pair of spaced longitudinally extending supporting I-beams 74 and 75 rest upon the upper surfaces of top plates 53 and 55, respectively, and are welded thereto. The supporting I-beams 74 and 75 have a length as discussed above for I-beams 45 and 46, and are provided with rings 76 for use with crane hooks.

The water passageways 36, 37 and 78 in platform member 10, and the water passageways 65, 66 and 79 in platform member 11 are shown as being filled with water 50 and 77, respectively. Preferably, the water 50 and 70 is present therein when the members 10 and 11 are positioned on soaking pit 15, and immediately thereafter the flow of fresh-cooling water via water inlet conduits 38 and 39 is commenced.

When practicing the method of the invention, the firing of an operating soaking pit 15 for heating steel ingots to a hot-rolling temperature is discontinued and the soaking pit cover is removed. The hot ingots may be removed from the soaking pit interior 22 and replaced with cold ingots, if desired. Thereafter platform member 11 is placed on one side of the opening 14 in the manner illustrated in FIG. 3 of the drawings. Platform member 10 is placed on the other side of the opening 14 and then the width of the resulting water-cooled platform 12 is adjusted to the position shown in FIG. 4 so as to closely conform with the width of the refractory wall 16. The platform members 10 and 11 are filled with water when placed on the soaking pit 15, and immediately thereafter quick release hose connections are attached to water inlet conduits 38, 39, 67 and 68 and fresh-cooling water is supplied thereto and withdrawn via water outlet conduits 40, 41, 69 and 70, respectively. The flow of cooling water through the water passageways 36, 37, 65, 66, 78 and 79 prevents the platform 12 from overheating. Workmen may stand on the upper surface of platform 12 and repair the damaged coping 17 in comfort immediately after commencing the flow of cooling water, and there is no need to wait for the refractory walls 16 to cool. It is preferred that modern gunning or ramming apparatus and commercially available materials for use therewith be employed to repair the damaged coping 17 so as to complete the repair work as soon as possible. The repairs to the coping 17 usually may be completed in 1 to 2 hours, and the soaking pit 15 may be placed back in service in about 1 to 3 hours. The refractory construction in the wall 16 does not cool sufficiently in this period of time to result in substantial damage due to temperature changes and the life of the overall refractory construction is increased substantially.

I claim:

1. A water-cooled platform member for use in making repairs to a hot top opening furnace for heating ferrous metal charge stock including refractory walls having a coping comprising an elongated water tight shell, the shell having water passageway means for passing cooling water therethrough whereby the platform may be water cooled and an upper surface on which workmen may stand when repairing the coping of a furnace, reinforcing means within the interior of the shell for reinforcing the same, means for supporting the shell within the opening in the furnace including at least one supporting beam, the supporting beam being of a length substantially greater than the length of the shell, means for mounting the supporting beam above the upper surface of the shell, the supporting beam being mounted whereby it extends longitudinally along the shell and above the said upper surface thereof and the outer end portions of the supporting beam extending past the ends of the shell, the shell being of a length whereby it may be lowered into the opening of a furnace having a coping to be repaired, the supporting beam being of a length whereby it extends across the said furnace having the coping to be repaired with the said outer end portions thereof resting on the coping when the shell is lowered into the furnace opening, means for introducing cooling water into the water passageway means in the shell, means for withdrawing water from the said water passageway means, and the shell having overlapping adjusting means along at least one side of the shell including a portion of the water passageway means whereby a plurality of the said platform members may be fitted together in side by side relationship and the effective width thereof may be varied.

2. The platform member of claim 1 wherein baffle means is provided in the said water passageway.

3. The platform member of claim 1 wherein the said shell is constructed of steel plates, the shell includes spaced longitudinally extending top and bottom plates, and the reinforcing means includes a longitudinally extending steel-reinforcing beam positioned between the top and bottom plates and intermediate the side edges thereof.

4. The platform member of claim 3 wherein the said shell includes spaced longitudinally extending steel side plates, and the baffle means includes steel baffle members extending transversely between the reinforcing beam and the side plates.

5. The platform member of claim 4 wherein the shell includes spaced transversely extending steel end plates, the ends of the reinforcing beam abut the end plates, the ends of the baffle members abut the reinforcing beam and the side plates and the reinforcing beam is rigidly attached to the top and bottom plates whereby the said shell is effectively reinforced thereby.

6. The platform member of claim 5 wherein the supporting beam and the reinforcing beam are I-beams, the top and bottom portions of the reinforcing I-beam are joined to the top and bottom plates whereby the shell is divided into two longitudinally extending water passageways, the means for introducing cooling water includes means for introducing cooling water into one end of each of the said two water passageways and the means for withdrawing water includes means for withdrawing water from the other ends thereof whereby the cooling water is caused to pass through the two water passageways, the means for supporting the shell in the furnace includes two spaced supporting I-beams which are positioned above the top plate and one of the supporting I-beams is above each of the two water passageways.

7. A water-cooled platform for use in making repairs to a hot top-opening furnace for heating ferrous metal charge stock including refractory walls having a coping, the platform including at least two platform members, each of said platform members comprising an elongated water-tight shell, the shell having water passageway means for passing cooling water therethrough whereby the platform may be water cooled and an upper surface area on which workmen may stand when repairing the coping of a furnace, reinforcing means within the interior of the shell for reinforcing the same, means for supporting the shell within the opening in the furnace including at least one supporting beam, the supporting beam being of a length substantially greater than the length of the shell, means for mounting the supporting beam above the upper surface of the shell, the supporting beam being mounted whereby it extends longitudinally along the shell and above the said upper surface thereof and the outer end portions of the supporting beam extending past the ends of the shell, the shell being of a length whereby it may be lowered into the opening of a furnace having a coping to be repaired, the supporting beam being of a length whereby it extends across the said furnace having the coping to be repaired with the said outer end portions thereof resting on the coping when the shell is lowered into the furnace opening, means for introducing cooling water into the water passageway means in the shell, means for withdrawing water from the said water passageway means, and the shell having overlapping adjusting means along at least one side of the shell including a portion of the water passageway means whereby a plurality of the said platform members may be fitted together in side by side relationship and the effective width thereof may be varied, the platform members being arranged in side by side relationship with the overlapping adjusting means thereof being fitted together whereby the effective width of the platform is adjustable.

8. The water-cooled platform of claim 7 wherein baffle means is provided in the said water passageway means.

9. The water-cooled platform of claim 7 wherein the said shell is constructed of steel plates, the shell includes spaced longitudinally extending top and bottom plates, and the reinforcing means includes a longitudinally extending steel-reinforcing beam positioned between the top and bottom plates and intermediate the side edges thereof.

10. The water-cooled platform of claim 9 wherein the said shell includes spaced longitudinally extending steel side plates, and the baffle means includes steel baffle members extending transversely between the reinforcing beam and the side plates.

11. The water-cooled platform of claim 10 wherein the shell includes spaced transversely extending steel end plates, the ends of the reinforcing beam abut the end plates, the ends of the baffle members abut the reinforcing beam and the side plates and the reinforcing beam is rigidly attached to the top and bottom plates whereby the said shell is effectively reinforced thereby.

12. The water-cooled platform of claim 11 wherein the supporting beam and the reinforcing beam are I-beams, the top and bottom portions of the reinforcing I-beam are joined to the top and bottom plates whereby the shell is divided into two longitudinally extending water passageways, the means for introducing cooling water includes means for introducing cooling water into one end of each of the said two water passageways and the means for withdrawing water includes means for withdrawing water from the other ends thereof whereby the cooling water is caused to pass through the two water passageways, the means for supporting the shell in the furnace includes two spaced supporting I-beams which are positioned above the top plate and one of the supporting I-beams is above each of the two water passageways.